Sept. 24, 1968  TEIJI ITO ET AL  3,403,060
WELDABLE HIGH TENSILE STRENGTH STEEL CAPABLE OF GIVING
WELD HEAT-AFFECTED ZONE HAVING HIGH TOUGHNESS
AND JOINT STRENGTH
Filed June 15, 1965

INVENTORS
Teiji   Ito
Makoto  Sato
Hajime  Nakasugi
Teluo   Umeda

BY Wenderoth, Lind
and Ponack, Attorneys

United States Patent Office 3,403,060
Patented Sept. 24, 1968

3,403,060
WELDABLE HIGH TENSILE STRENGTH STEEL CAPABLE OF GIVING WELD HEAT-AFFECTED ZONE HAVING HIGH TOUGHNESS AND JOINT STRENGTH
Teiji Ito, Makoto Sato, Hajime Nakasugi, and Teluo Umeda, Kitakyushu, Japan, assignors to Yawata Iron & Steel Co., Ltd., Tokyo, Japan
Filed June 15, 1965, Ser. No. 464,005
Claims priority, application Japan, June 18, 1964, 39/34,574
5 Claims. (Cl. 148—36)

ABSTRACT OF THE DISCLOSURE

Weldable high tensile strength steel which when it is welded has a high toughness in the whole heat-affected zone and which produces a welded joint of high joint strength, consisting essentially of C in an amount less than 0.10% by weight, 0.10–0.75% by weight of Si, 1.10–2.50% by weight of Mn, 0.10–1.50% by weight of Cr, 0.20–0.80% by weight of Mo, 0.02–0.15% by weight of V, 0.003–0.20% by weight of Al, the balance being Fe and unavoidable impurities.

---

Figure 1:
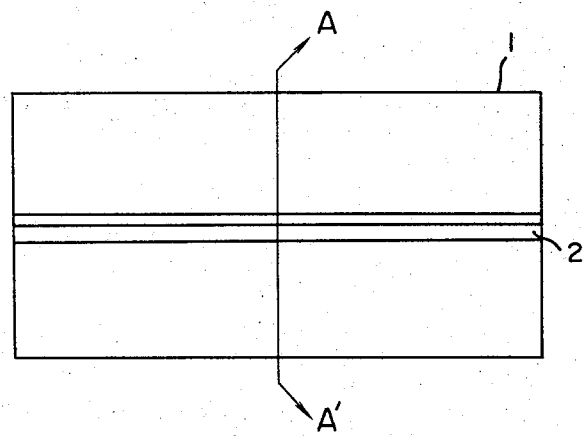

This invention relates to high tensile strength steel giving weld whole heat-affected zone showing excellent toughneess even when the zone is subjected to a heat cycle of rapid heating and quenching at welding, and more particularly, to high tensile strength steel giving a weld showing good notch toughness even in the case of carrying out a large heat input welding such as submerged arc welding as well as showing no lowering of joint strength by the influence of welding heat.

When structural steel is welded, there are formed bond zones adjacent the weld steel, that is, there are formed boundary zones between the base metal and the weld metal, heat-affected zones outside said boundary zones, and softened zones further outside said heat-affected zones. The term "weld heat-affected zone" may be employed in some cases to mean all the three zones mentioned above but in the case of meaning all the three zones or including the weld metal zone, the expression "whole heat-affected zone" is employed in the specification and the claims of this invention.

In general, when structural steel is welded by a hand arc welding method, the whole heat-affected zone shows complicated structure being affected by various welding heat cycles. That is, since the bond zone is heated up rapidly near the melting point of the structural steel and cooled down comparatively rapidly by the heat transfer into the base metal, the crystal grain of the steel at the zone is coarsened and also since the bond zone is hardened by quenching, the notch toughness of the zone is lowered, while in the heat-affected zone outside said bond zone, as being heated to about 900° C. above the $A_3$ transformation point, the crystal grain is fined and the notch toughness is comparatively high because of the heating temperature being low, even though the zone is rapidly heated and cooled as in the case of the bond zone. Further, in the zone outside the heat-affected zone, or the softened zone, heated to about 750° C., to temperatures between the $A_1$ transformation point and the $A_3$ transformation point, and to temperatures right below the $A_1$ transformation point of the steel, the zone shows softening phenomenon which is an important problem on maintaining joint strength of high tensile strength steel. Also, a zone of the base metal heated to a comparatively low temperature lower than the $A_1$ transformation point, e.g., to 200–300° C. is lowered in notch toughness caused by strain ageing by welding restriction. Particularly, in the case of requiring a large amount of heat input as in the case of welding by an automatic welding method, the zone is liable to suffer a high temperature pre-strain and the notch toughness is lowered to an extent that cannot be disregarded.

In the case of welding structural materials by an automatic welding method, it has been usually considered that the required amount of heat input is large, softening of the bond zone is low, and a high notch toughness can be obtained. However, in fact, the crystal grains are remarkably coarsened and good results are not always obtained. In particular, in the case of refined high tensile strength steel having a high yield point and a good notch toughness, the tempered martensitic structure of the base material is damaged, which is undesirable.

That is, the bond zone is, when welded by adopting an automatic submerged arc welding method, heated to temperatures near the melting point of the metal, the heating velocity is slower than the case of adopting a hand arc welding method, and also the cooling velocity is slow since the amount of heat input is large. Accordingly, there occurs remarkable growth of the crystal grains. As the result, the notch toughness of the bond zone is extremely lowered in spite of that the zone is cooled comparatively slowly and hardening is less, which makes a very important problem from a viewpoint of preventing brittle fracture of welded steel structures. The above-mentioned reduction of notch toughness is caused mainly by the fact that since the number of heat cycles applied to the weld at the automatic arc welding is small, thus formed brittle structure cannot be improved by the subsequent heat cycles, by the diffusion between the weld steel and the heat-affected zone, and by the formation of partial molten zone in the heat-affected zone.

A main problem encountering in the case of carrying out large heat input welding such as automatic arc welding is the reduction of the joint efficiency by the formation of the above-mentioned softened zone. As mentioned above, the bond zone is maintained at a high temperature for a comparatively long period of time and then cooled gradually but this tendency is the same in the heat-affected zone and in the softened zone. Therefore, the softened zone of the heat-affected zone is heated to temperatures higher and lower than the $A_1$ transformation point to cause the agglomeration of carbite and the spheroidization and coarsening of carbite by the local formation of austenite, which shows an extremely softening phenomenon.

In particular, since refined high tensile strength steel is increased in strength by the heat treatment, it is a problem how the strength reduction of the weld softened zone, that is, the zone heated to a temperature above the temperature may be restrained low.

According to the present invention, the above difficulties are overcome by specifying the alloying elements contained in structural steel.

Therefore, an object of this invention is to provide steel giving improved notch toughness in the bond zone, reducing the softened zone and lowering the softened extent.

Another object of this invention is to provide steel of which the weld whole heat- affected zone has excellent toughness and strength even subjected to welding of a large heat input as in the case of conducting welding by an automatic arc welding method.

Still another object of this invention is to provide steel giving weld joints having above 70 kg./sq. mm. of yield strength and also giving heat-affected zone having an excellent notch toughness even subjected to welding of a large heat input.

Those and further objects of the present invention will become clear by the explanations described hereinafter referring to the accompanying drawings, in which FIG. 1 is a plain view of a specimen taken for conducting an impact test and a tensile test on the bond zone and the center part of the heat-affected zone of a submerged arc welded zone.

Figure 2:
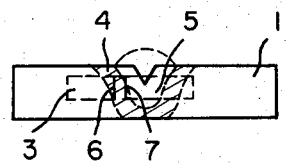
Figure 3:
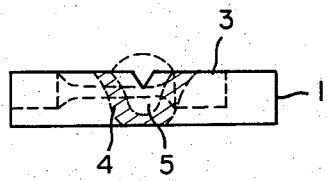

FIG. 2 is a sectional view along the A–A' line of FIG. 1, which shows the position where the 2 mm. V-Notch Charpy specimen for impact test is taken out after welded, and FIG. 3 is a sectional view along the A–A' line of FIG. 1, which shows the position where the specimen for tensile test is taken out.

The above objects can be achieved by the steel of this invention which contains the following elements in the ranges shown below,

|   |   | Wt. percent |
|---|---|---|
| C | Max | 0.11 |
| Si | | 0.10–0.75 |
| Mn | | 1.10–2.50 |
| Cr | | 0.10–1.50 |
| Mo | | 0.20–0.80 |
| V | | 0.02–0.15 |
| Al | | 0.003–0.20 |

However, besides the above elements the steel of the instant invention may contain Ni, if necessary.

The high tensile strength steel of this invention is obtained by quenching and tempering or normalizing steel containing the above elements.

The reasons for selecting the alloying elements of the component ranges as above mentioned in the high tensile strength steel of this invention are as follows.

The C content is preferably lower than 0.10% by weight of possible from the notch toughness of the bond zone and if the C content is higher than the value the notch toughness is reduced. However, since the reduction of C content to an extreme low C steel is encountered some problems in steel manufacturing, the upper limit of the C content should be defined to 0.11 and in such a case there is noticed no extreme reduction of the above effect as compared with the case of containing 0.10 percent of C. Accordingly, the upper limit of the C content is defined to 0.11% in this invention.

The Si content must be above 0.10% by weight from the view point of steel manufacture and further this is desirable from the point of notch toughness of the bond zone. However, if the Si content is too high, the impact characteristics is reduced and the tendency for weld crack, etc., becomes large. Hence, the upper limit of the Si content is desirably about 0.75%.

By our experimental results, the presence of Mn is very effective for improving the notch toughness of the bond zone and since Mn-containing steel shows a high hardenability even in the case of carrying out a large heat input welding such as automatic arc welding, the low-carbon martensite structure is easily formed. The martensite structure containing 0.10–1.5% of Mn has a good notch toughness and low sensitivity to weld crack. If the Mn content exceeds 1.5%, the sensitivity to weld crack is slightly increased but since the cooling velocity is comparatively slow in the case of applying an automatic arc welding method which is one of the objects of this invention, a compartively good result is obtained up to the Mn content of 1.70%. Further, in the case of, in particular, carrying out a large heat input welding, the notch toughness of the whole heat-affected zone, especially, of the bond zone can be improved by increasing the Mn content exceeding 1.70% to 2.5%.

Cr is a hardening element as in the case of Mn and is necessary for forming martensite in the whole heat-affected zone of a low cooling velocity at a large heat input welding. However, if the Cr content is too large, the notch toughness of the bond zone is not always good. Further, there are some problems in the point of weldability and hence the desirable range is 0.10–0.80% by weight. However, it has been found that when adopting particularly a large heat input welding process, the increase of the Cr content exceeding 0.80% up to 1.50% gives good effects for improving the notch toughness of the whole heat-affected zone and for preventing weld softening.

Mo and V have the similar effects for improving hardenability as well as increasing the tempering resistance and preventing the formation of softened portions by automatic arc welding, etc., and hence are necessary elements for obtaining desired joint strength. Though the reduction of joint strength is completely prevented by the addition of a large proportion of these elements, the notch toughness of the bond zone is not always improved by the addition of a large amount of them. Therefore, it is better to limit these elements to the minimum possible amount, and the addition of 0.20% by weight of Mo and 0.02% by weight V may give some effect but the contents showing remarkable effects were found to be 0.46–0.80% of Mo and 0.03–0.15% of V.

Al is added for grain refining treatment of steel, and the preferred component range is 0.003–0.20% by weight. In particular, it has been cleared in the high tensile strength of this invention as shown in examples of this invention that the notch toughness of the bond zone is improved by increasing the Al content in an extent slightly higher than that of conventional high tensile strength steel.

P and S are impurities unavoidably accompanied in manufacturing the steel and it has been cleared that the notch toughness of the bond zone is increased as the contents of the elements are lower. The upper limit of P is 0.03% by weight and that of S is 0.04% by weight.

Further, the high tensile strength steel of this invention may contain Ni and/or Ti.

It has been found that the addition of Ni increases the hardenability and even in the case of adopting a large heat input welding method, forms easily martensite and improves markedly the notch toughness of bond zone. But, as the results of attempting the reduction of the content of Ni as low as possible on account of economic problem, it has been cleared that the above effect can be obtained by the addition of about 0.5% by weight of Ni. In this respect, if the Ni content is increased to 1.5%, the cost of the steel becomes high but the properties of the whole weld are stabilized. However, it should be understood that even in the case of adding no Ni, good results may be obtained as shown in the examples below by selecting suitably other components.

The addition of a small proportion of Ti is effective for increasing hardenability and tempering resistance but since the addition of Ti in an amount higher than 0.10% by weight gives undesirable influence on the formation of the weld heat-affected zone having a high toughness, the addition amount should be restrained as low as possible.

Besides the above mentioned elements the high tensile strength steel of the present invention may contain B and/or Cu, if necessary.

The presence of B increases the hardenability and a small amount of B is effective for improving the notch toughness of bond zone, but if the element is added excessively, the notch toughness is sensitively infected. Therefore, it has been cleared in the case of adding B, the maximum amount shall be 0.006% by weight.

In case where corrosion resistance is required about steel, the property can be improved by the addition of Cu. However, since there is noticed the tendency of forming hot crack if a large amount of Cu is added, the allowable maximum is up to 0.5% by weight.

The high tensile strength steel of the present invention contains, as mentioned above, a low proportion of C but high proportions of Mn and Mo. If the C content is higher than the value shown in this invention, the notch toughness of the weld heat-affected zone and bond zone is, as stated above, reduced. This will become clear by compar-

TABLE 1.—CHEMICAL COMPOSITION AND MECHANICAL PROPERTY OF TEST STEEL SPECIMEN

| | Chemical composition (wt. percent) | | | | | | | | | | | | | Mechanical property | | | | | Remarks |
|---|---|---|---|---|---|---|---|---|---|---|---|---|---|---|---|---|---|---|---|
| | C | Si | Mn | P | S | Cu | Ni | Cr | Mo | V | Ti | B | Al | Yield point (kg./mm.²) | Tensile strength (kg./mm.²) | Elongation, percent (GL=50mm.) | vEo (kg.-m/cm.) | vTr15 (°C.) | vTrs (°C.) | |
| A | 0.09 | 0.32 | 1.29 | 0.011 | 0.009 | 0.07 | | 0.70 | 0.62 | 0.08 | 0.01 | | 0.110 | 76.4 | 82.5 | 28.0 | 20.8 | −100 | −71 | Steel of the present invention, Ceq.=0.619. |
| B | 0.10 | 0.29 | 1.31 | 0.012 | 0.011 | 0.10 | | 0.69 | 0.60 | 0.08 | 0.01 | 0.0030 | 0.105 | 77.1 | 84.3 | 27.5 | 18.3 | −100 | −77 | Steel of the present invention, Ceq.=0.624. |
| C | 0.08 | 0.25 | 1.33 | 0.009 | 0.012 | 0.13 | | 0.72 | 0.60 | 0.08 | 0.02 | | 0.120 | 78.0 | 81.7 | 26.8 | 19.0 | −100 | −68 | Steel of the present invention, Ceq.=0.610. |
| D | 0.10 | 0.26 | 1.19 | 0.010 | 0.009 | 0.19 | 0.28 | 0.59 | 0.57 | 0.08 | | | 0.115 | 75.7 | 85.0 | 27.2 | 18.5 | −100 | −80 | Steel of the present invention, Ceq.=0.583. |
| E | 0.08 | 0.28 | 1.20 | 0.010 | 0.010 | 0.20 | 0.30 | 0.63 | 0.59 | 0.09 | | 0.0036 | 0.110 | 76.9 | 84.6 | 27.2 | 18.0 | −100 | −82 | Steel of the present invention, Ceq.=0.580. |
| F | 0.07 | 0.28 | 1.28 | 0.010 | 0.012 | 0.11 | 0.32 | 0.65 | 0.58 | 0.08 | | 0.0021 | 0.103 | 77.3 | 85.2 | 28.1 | 16.5 | −100 | −75 | Steel of the present invention, Ceq.=0.575. |
| G | 0.11 | 0.28 | 1.23 | 0.011 | 0.013 | 0.14 | 0.33 | 0.60 | 0.55 | 0.08 | 0.02 | | 0.112 | 78.8 | 85.6 | 27.4 | 16.7 | −100 | −78 | Steel of the present invention, Ceq.=0.606. |
| H | 0.07 | 0.33 | 1.85 | 0.012 | 0.008 | 0.15 | | 0.60 | 0.62 | 0.08 | 0.01 | 0.0021 | 0.090 | 75.7 | 83.4 | 28.0 | 18.2 | −100 | −78 | Steel of the present invention, Ceq.=0.768. |
| I | 0.06 | 0.35 | 1.29 | 0.012 | 0.008 | 0.15 | 1.43 | 1.30 | 0.60 | 0.03 | | | 0.060 | 78.3 | 85.7 | 27.1 | 20.5 | −100 | −80 | Steel of the present invention, Ceq.=0.653. |
| J | 0.06 | 0.30 | 1.34 | 0.012 | 0.008 | 0.18 | 0.96 | 0.95 | 0.53 | 0.04 | 0.03 | 0.0020 | 0.070 | 78.7 | 86.2 | 28.7 | 19.4 | −100 | −90 | Steel of the present invention, Ceq.=0.675. |
| K | 0.14 | 0.26 | 0.83 | 0.008 | 0.008 | 0.26 | 1.50 | 1.03 | 0.45 | 0.02 | | | 0.021 | 75.6 | 83.2 | 27.2 | 16.3 | −100 | −95 | Conventional high tensile strength steel, Ceq.=0.554. |
| L | 0.14 | 0.30 | 0.89 | 0.011 | 0.007 | 0.26 | 1.06 | 0.95 | 0.37 | 0.05 | | 0.0020 | 0.007 | 78.3 | 83.8 | 26.6 | 19.3 | | | Conventional high tensile strength steel, Ceq.=0.584. |

NOTE.—vEo=V-Notch Charpy impact test 0° C. vTr15=V-Notch Charpy 15 ft./lb. transition temperature. vTrs=V-Notch Charpy 50% ductile transition temperature. Ceq. (Carbon equivalent) = C+1/24 Si+1/6 Mn+1/40 Ni+1/5 Cr+1/4 Mo+1/14 V (percent).

TABLE 2.—MECHANICAL PROPERTY OF WELD HEAT AFFECTED ZONE (SUBMERGED ARC WELDING SINGLE LAYER WELDING)

| | | Welding conditions I | | | | | Welding conditions II | | | | | Welding conditions III | | | | |
|---|---|---|---|---|---|---|---|---|---|---|---|---|---|---|---|---|
| | | Heat input 36,000 Joule/cm. | | | | | Heat input 51,500 Joule/cm. | | | | | Heat input 69,000 Joule/cm. | | | | |
| | Thickness (mm.) | Tensile strength of welded joint (kg./mm.²) | V-Notch Charpy impact test value (kg.-m/cm.²) | | | | Tensile strength of welded joint (kg./mm.²) | V-Notch Charpy impact test value (kg.-m/cm.²) | | | | Tensile strength of welded joint (kg./mm.²) | V-Notch Charpy impact test value (kg.-m/cm.²) | | | |
| | | | Test temperature of bond zone | | Test temperature of heat affected zone (2 mm. from bond zone) | | | Test temperature of bond zone | | Test temperature of heat affected zone (2 mm. from bond zone) | | | Test temperature of bond zone | | Test temperature of heat affected zone (2 mm. from bond zone) | |
| | | | 0° C. | −40° C. | 0° C. | −40° C. | | 0° C. | −40° C. | 0° C. | −40° C. | | 0° C. | −40° C. | 0° C. | −40° C. |
| A | 20 | 79.8 | 15.3 | 9.4 | 17.3 | 10.5 | 78.5 | 7.0 | 2.5 | 14.2 | 3.5 | | | | | |
| B | 20 | 81.2 | 14.5 | 9.0 | 16.7 | 12.6 | 79.0 | 6.8 | 2.8 | 13.3 | 4.0 | | | | | |
| C | 20 | 82.0 | 13.7 | 8.7 | 18.5 | 11.4 | 80.1 | 6.5 | 2.6 | 16.1 | 4.3 | | | | | |
| D | 20 | 84.3 | 15.9 | 9.3 | 19.1 | 14.7 | 79.5 | 8.2 | 4.0 | 16.3 | 5.2 | | | | | |
| E | 20 | 80.5 | 15.1 | 11.8 | 14.2 | 9.8 | 79.7 | 7.9 | 4.4 | 13.8 | 4.7 | | | | | |
| F | 20 | 82.1 | 13.4 | 8.4 | 17.4 | 11.5 | 80.9 | 7.6 | 3.8 | 12.9 | 4.9 | | | | | |
| G | 20 | 81.6 | 15.8 | 10.6 | 13.8 | 10.9 | 82.5 | 6.7 | 3.8 | 15.7 | 5.0 | | | | | |
| H | 20 | | | | | | 82.1 | 8.8 | 3.0 | 18.4 | 6.8 | 81.8 | 4.7 | 2.6 | | |
| I | 20 | | | | | | 83.7 | 10.3 | 4.7 | 19.2 | 7.4 | 82.9 | 9.3 | 4.3 | | |
| J | 20 | | | | | | 84.5 | 11.1 | 4.2 | 17.7 | 7.0 | 84.0 | 8.5 | 4.4 | | |
| K | 20 | 75.8 | 7.3 | 4.6 | 12.6 | 11.6 | 72.3 | 2.1 | 1.1 | 2.9 | 2.4 | | | | | |
| L | 20 | 74.1 | 3.5 | 0.9 | 11.2 | 5.4 | 71.4 | 1.9 | 0.8 | 2.6 | 1.3 | | | | | |

(Note No. 1) Welding conditions:

| | Electric current | Voltage | Welding velocity | Core diameter |
|---|---|---|---|---|
| I | 600 amp. | 30 volt. | 30 cm./min. | 3/16″ φ |
| II | 830 amp. | 31 volt. | 30 cm./min. | 1/4″ φ |
| III | 900 amp. | 31 volt. | 24 cm./min. | 1/4″ φ |

Used core: Y-DM (0.14% C, 0.05% Si, 1.9% Mn and 0.5% Mo), Y-80M (0.17% C, 1.5% Mn, 0.5% Cr, 0.5% Mo and 2.5% Ni).

Flux: YF-15 (15.0% MnO-SiO$_2$-CaO-MgO-TiO$_2$ Series), YF-200 (SiO$_2$-CaO-Al$_2$O$_3$-MgO-CaF$_2$ Series)

(Note No. 2): All specimens in I; A–G, K and L in II; H–J in II; all specimens in III.

ing the below-described examples of this invention with conventional K steel. Further, as the result of adding a high proportion of Mn, the hardenability and the microscopic structure of the bond zone at a large heat input welding are improved and the notch toughness is increased. The content of Mo is also high in the high tensile strength steel of this invention. This is for preventing occurrence of softening at a large heat input welding, that is, softening is restrained by the precipitation phenomenon when heated to the softening point. Thus, it is worthy of note that the structural steel of this invention has, in spite of the low C content, a good base metal strength almost same as that of conventional high tensile strength steel shown for a comparison in the following example, an excellent notch toughness of the whole heat-affected zone in the weld also, and a joint strength higher than that of conventional steel even in the case of adopting a large heat input welding.

In the preceding Table 1, there are shown the chemical compositions and mechanical properties of the specimens of the examples of the high tensile strength steel of this invention together with those of several conventional steels.

In the preceding Table 2, there shown joint strength and notch toughness of the bond zone and the heat-affected zone after welding of steels shown in Table 1.

As the welding method for steel in the preceding Table 2, single-layer welding by submerged arc welding was adopted. In general, as the notch toughness of the whole heat-affected zone by a multi-layer welding is higher than that by a single-layer welding, a single-layer welding test was adopted in the examples of this invention. However, the reduction of strength is higher in a multi-layer welding, which has been also carefully investigated.

The test specimen in the examples is as shown in FIG. 1 to FIG. 3. That is, from a weld test piece of 20 mm. in thickness, 200–400 mm. in length and 100 mm. in width as shown in FIG. 1, a 2 mm. V-notch Charpy test specimen 3 shown by the dotted line in FIG. 2 was taken out and also a tensile test specimen 3 as shown by the dotted line in FIG. 3 was taken out. In FIG. 2 or FIG. 3, the shaded portion 4 indicates a heat-affected zone and zone 5 indicates a weld metal zone. In addition the notched position of the impact test specimen is shown by the numeral 6 or 7 in FIG. 2.

From the above results, it can be understood that the high tensile strength steel of this invention is very excellent as compared with conventional steel and it is particularly true in the case of adopting a large heat input welding.

Accordingly, even in the case of adopting automatic arc welding, it is not necessary to control the amount of heat input, which brings large advantages. That is, in the case of using conventional steel, in order to obtain good notch toughness of the heat-affected zone, the cooling velocity must be increased in some extent by controlling the amount of heat input at welding, which causes a large difficulty in the operation of welding. Moreover, in case where the amount of heat input is comparatively low and the cooling velocity of the bond zone is comparatively large, there is considerable difference in the impact energy as shown in Table 2. That is, it can be understood that the sensitivity to brittle rapture of the weld whole heat-affected zone of the steel of this invention is much lower than that of conventional steel. For comparing weldability, the steels shown in Table 1 are subjected to hand welding and then to a small "Tekken type" (y groove) crack test. The results are shown in Table 3. At that, the small "Tekken type" (y groove) crack test is shown in the report by Hiroshi Kihara et al. entitled "Cracking Tests of High-Strength Steel" in "Welding Journal"; vol. 41, pp. 365–485 (1962), January.

TABLE 3.—RESULTS OF HIGHEST HARDNESS TEST AND SMALL "TEKKEN TYPE" CRACK TEST (HAND WELDING)
[Average of sections three plates, each plate being divided into five equal sections]

| Specimen | IIW highest hardness test (Hv) | Pre-heating to 100° C. before welding | | | Pre-heating to 125° C. before welding | | | Remarks |
|---|---|---|---|---|---|---|---|---|
| | | Surface cracking ratio, percent | Section cracking ratio, percent | Route cracking ratio, percent | Surface cracking ratio, percent | Section cracking ratio, percent | Route cracking ratio, percent | |
| A | 418 | 0 | 0 | 0 | 0 | 0 | 0 | |
| B | 421 | 0 | 2 | 7 | 0 | 0 | 0 | |
| C | 415 | 0 | 0 | 0 | 0 | 0 | 0 | |
| D | 427 | 0 | 0 | 0 | 0 | 0 | 0 | |
| E | 420 | 0 | 0 | 0 | 0 | 0 | 0 | Steel of the present invention. |
| F | 395 | 0 | 0 | 0 | 0 | 0 | 0 | |
| G | 410 | 0 | 0 | 0 | 0 | 0 | 0 | |
| H | 395 | 0 | 2 | 5 | 0 | 0 | 0 | |
| I | 390 | 0 | 0 | 0 | 0 | 0 | 0 | |
| J | 390 | 0 | 0 | 0 | 0 | 0 | 0 | |
| K | 435 | 0 | 0 | 0 | 0 | 0 | 0 | Conventional high tensile strength steel. |
| L | 430 | 0 | 1 | 7 | 0 | 0 | 0 | |

Welding condition: Welding rod, Ni-Cr-Mo Series, low hydrogen series; Current, 170A, Voltage 26V, welding velocity 150 mm./min., heat input 1.77 K Joule/cm.

From these results, it is clear that even if the contents of the alloying elements of the steel of this invention are a little higher than that of conventional steel and the carbon equivalent in the former is slightly higher than that of the latter, the pre-heating temperature for preventing crack formation is almost same in both cases. However, the International Institute of Welding Maximum Hardness of the steel of this invention obtained from the results of a rapid heating expansion test (heating temperature 1350° C.) corresponding to the cooling velocity of the weld heat-affected zone in International Institute of Welding Maximum Hardness Test is slightly lower than that of conventional steel and the weldability of the present steel at hand welding is better than that of conventional steel.

As mentioned above in detail, it is clear that the high tensile strength steel of the present invention is a novel steel from the fact that the whole heat-affected zone of the present steel after welded shows an excellent impact resistance that has never been obtained in conventional steel and that the present steel is a high tensile strength steel having a high yield strength without necessity of controlling the amount of heat input in operation when adopting presently used welding methods.

What we claim is:

1. Weldable high tensile strength steel which when it is welded has a high toughness in the whole heat-affected zone and which produces a welded joint of high joint strength, consisting of C in an amount less than 0.10% by weight, 0.10–0.75% by weight of Si, 1.10–2.50% by weight of Mn, 0.10–1.50% by weight of Cr, 0.20–0.80% by weight of Mo, 0.02–0.15% by weight of V, 0.003–0.20% by weight of Al, the balance being Fe and unavoidable impurities, said steel being quenched from a temperature higher than the $A_3$ transformation point and further tempered at a temperature lower than the $A_1$ transformation point.

2. The weldable high tensile strength steel as claimed in claim 1, wherein said steel further contains Ti in an amount less than 0.1% by weight.

3. The weldable high tensile strength steel as claimed in claim 1, wherein said steel further contains B in an amount less than 0.006% by weight.

4. The weldable high tensile strength steel as claimed in claim 1, wherein said steel is obtained by normalization treatment.

5. The weldable high tensile strength steel as claimed in claim 1, wherein said steel consists of C in an amount of less than 0.10% by weight, 0.10–0.75% by weight of Si, 1.10–1.70% by weight of Mn, 0.10–0.80% by weight of Cr, 0.45–0.80% by weight of Mo, 0.03–0.15% by weight of V, and 0.003–0.20% by weight of Al, the balance being Fe and unavoidable impurities.

References Cited

UNITED STATES PATENTS

| | | | |
|---|---|---|---|
| 2,770,563 | 11/1956 | Herzog | 75—124 XR |
| 2,825,669 | 3/1958 | Herzog | 75—125 XR |
| 3,110,586 | 11/1963 | Gulya | 75—128 |
| 3,110,635 | 11/1963 | Gulya | 148—36 |
| 3,110,798 | 11/1963 | Keay | 75—124 XR |
| 3,216,823 | 11/1965 | Gulya | 75—124 |

L. DEWAYNE RUTLEDGE, *Primary Examiner.*

P. WEINSTEIN, *Assistant Examiner.*